(12) United States Patent
Kunita (10) Patent No.: US 7,606,461 B2
(45) Date of Patent: Oct. 20, 2009

(54) IMAGE RECORDING APPARATUS

(75) Inventor: Yoshiyuki Kunita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 817 days.

(21) Appl. No.: 11/344,150

(22) Filed: Feb. 1, 2006

(65) Prior Publication Data

US 2006/0171671 A1 Aug. 3, 2006

(30) Foreign Application Priority Data

Feb. 2, 2005 (JP) ............... 2005-025954

(51) Int. Cl.
*H04N 5/91* (2006.01)
(52) U.S. Cl. ............... 386/46; 386/124; 348/500
(58) Field of Classification Search ............... 386/11, 386/46, 61, 71, 83, 124–126; 375/354–364; 348/500

See application file for complete search history.

(56) References Cited

U.S. PATENT DOCUMENTS 5,895,123 A * 4/1999 Fujii et al. ............... 386/96

2002/0120925 A1 * 8/2002 Logan ............... 725/9
2004/0015999 A1 * 1/2004 Carlucci et al. ............... 725/136
2004/0068746 A1 * 4/2004 Mori et al. ............... 725/88

FOREIGN PATENT DOCUMENTS

JP 2003-018484 1/2003
JP 2003-319315 11/2003

* cited by examiner

Primary Examiner—Thai Tran
Assistant Examiner—Mishawn Dunn
(74) Attorney, Agent, or Firm—Crowell & Moring LLP

(57) ABSTRACT

An image recording apparatus comprising: a receiving unit to receive a broadcast signal pertaining to a predetermined broadcast; a recording unit to record video data composed of sound data and image data, both based on a received broadcast signal; detection unit to detect an end of the predetermined broadcast based on the received broadcast signal; timer unit to time a detection time for which the detection means continues detecting of the end of the broadcast; judgment unit to judge whether the detection time timed by the timer unit has reached a predetermined elapsed time or not; and record erasing unit to stop recording the video data in the recording unit and to erase the video data having been recorded in the recording unit while the timer means has been timing the predetermined elapsed time, when the judgment means judges that the detection time has reached the predetermined elapsed time.

13 Claims, 2 Drawing Sheets

FIG.1

IMAGE RECORDING APPARATUS

BACKGROUND OF THE INVENTION

1. Field of the Invention

The present invention relates to an image recording apparatus.

2. Description of Related Art

There has been conventionally a broadcast receiving apparatus such as a television receiver, which receives a broadcast signal of a tuned channel and outputs video and audio corresponding to the broadcast signal of the channel.

There is known a broadcast receiving apparatus which monitors a synchronization signal of a receiving broadcast signal and judges that the broadcast of a tuned channel has ended to display a "sandstorm screen" based on the fact that the synchronization signal is not detected to automatically tune another channel which matches the taste of a user (see, for example, JP 2003-18484A).

Moreover, there is an image recording apparatus which receives a broadcast signal of a desired channel and at the same time records the video and the like corresponding to the broadcast signal of the channel.

There has been also known an image recording apparatus which stops image recording based on the detection of a broadcast end signal indicating the end of the broadcast of a tuned channel and a change of the screen to the "sandstorm screen" or a "color bar screen" according to the state of the receiving broadcast signal during the image recording of user's desired video or the like (see, for example, JP 2003-319315A).

However, in case of the technique disclosed in the JP 2003-18484A, because a channel is rapidly changed automatically by tuning another channel based on the non-detection of any synchronization signals in a broadcast signal, broadcasts are sometimes changed to the broadcast of an undesired channel when false detection exists in the detection of the synchronization signals, and a broadcast of a channel contrary to the user's wish is sometimes performed.

That is, when the video and the like based on the broadcast signal received by the broadcast receiving apparatus are being recorded by image recording equipment, the image recording of the broadcast of an undesired channel is performed.

Moreover, in case of the technique disclosed in the JP 2003-319315A, because image recording is made to be rapidly stopped based on the detection of a broadcast end signal, the technique has a problem of a stop of image recording contrary to the user's wish owing to a false detection of the broadcast end signal.

SUMMARY OF THE INVENTION

It is an object of the present invention to provide an image recording apparatus capable of performing the image recording of the video pertaining to a desired broadcast without recoding any unnecessary video after the end of the broadcast.

According to a first aspect of the invention, an image recording apparatus comprises: a receiving un it to receive a broadcast signal pertaining to a predetermined broadcast; a recording unit to record video data composed of sound data and image data, both based on the broadcast signal received by the receiving unit; a sound output unit to output a sound based on the sound data; an image display unit to display an image based on the image data; detection unit to detect an end of a predetermined broadcast according to the broadcast signal received by the receiving unit based on a fact that no synchronization signals are included in the broadcast signal, or a fact that the sound data in the broadcast signal is a sound signal having a specific frequency and the image data in the broadcast signal is an image signal for displaying a specific image, or a fact that a rate of a variation of the sound based on the sound data in the broadcast signal is within a predetermined range and a rate of a variation of the image based on the image data in the broadcast signal is within a predetermined range; timer unit to time a detection time for which the detection unit continues to detect the end of the broadcast; judgment unit to judge whether the detection time timed by the timer unit has reached a first elapsed time or not, and to judge whether the detection time has reached a second elapsed time or not; and record erasing unit to stop an output of the sound based on the sound data from the sound output unit when the judgment unit judges that the detection time has reached the first elapsed time, and then to stop a display of the image based on the image data on the image display unit, to stop recording the video data in the recording unit and to erase the video data having been recorded in the recording unit while the timer means has been timing a predetermined elapsed time when the judgment means subsequently judges that the detection time has reached the second elapsed time.

Thereby, in the image recording apparatus, when the ended state of the predetermined broadcast has been continuously detected for the time equivalent to the first elapsed time from the detection of the end of the predetermined broadcast at the time of recording the video data in the recording unit which data is based on the broadcast signal pertaining to the predetermined broadcast received by the receiving unit, first, it is possible to stop the outputting of the sound based on the sound data from the sound output unit. Then, when the ended state of the broadcast has been continuously detected for the time equivalent to the longer second elapsed time, the display of the image based on the image data on the image display unit is stopped, and the recording of the video data in the recording unit is stopped. Then, the unnecessary video data having been recorded in the recording unit during, for example, the second elapsed time, which is the predetermined elapsed time, can be erased from the recording unit.

Accordingly, by stopping the outputting of the sound from the sound output unit when the image recording apparatus has continuously detected the ended state of the broadcast for the time equivalent to the first elapsed time, the image recording apparatus performs the warning indicating that the image recording apparatus does not receive the broadcast signal of the predetermined broadcast, and it becomes possible to prevent the output of, for example, unpleasant noise sounds in the "sandstorm screen", which is unnecessary video after the end of the broadcast. Moreover, when the image recording apparatus has been continuously detecting the ended state of the broadcast for the time equivalent to the second elapsed time, it is possible to stop the recording of the video data to the recording unit, and to erase the unnecessary video data from the recording unit which data has been recorded in the recording unit during the predetermined elapsed time.

That is, in comparison with the conventional apparatus, which rapidly stops the image recording at the time of detecting the end of a broadcast, the image recording apparatus of the first aspect of the present invention can decrease the generation of the malfunction of the stop of image recording in the case where the detection of the end of the broadcast is a false detection, and can suitably perform the image recording of the video pertaining to the desired broadcast.

Moreover, by erasing the recorded unnecessary video data based on the predetermined elapsed time, the recording of the unnecessary video after the end of the broadcast can be prevented. Consequently, it is possible to perform image recording by recording desired video and the like in the recording unit over a longer period.

In particular, the image recording apparatus takes the following criteria of judgment for detecting the end of the predetermined broadcast according to the broadcast signal received by the receiving unit: no synchronization signals are included in the broadcast signal; the sound data in the broadcast signal is the sound signal having the specific frequency, and the image data in the broadcast signal is the image signal indicating the specific image; and the rate of the variation of the sound based on the sound data in the broadcast signal is within the predetermined rate range, and the rate of the variation of the image based on the image data in the broadcast signal is within the predetermined rage range.

Here, because the state in which no synchronization signals are included in the broadcast signal indicates that the broadcast waves are in the state of being stopped and corresponds to the state in which the predetermined broadcast has ended and the "sandstorm screen" is displayed, the image recording apparatus is configured to delete the video data from the recording unit after the recording for a certain fixed time in the recording unit in the state in which the predetermined broadcast has ended and the "sandstorm screen" is displayed. Consequently, it is possible not to record the "sandstorm screen", which is unnecessary video after the end of the broadcast, in the recording unit in the image recording apparatus.

Moreover, the state in which the sound data in the broadcast signal is the sound signal having the specific frequency and the image data in the broadcast signal is the image signal to display the specific image indicates that the broadcast wave is a broadcast wave for an electric wave test, and corresponds to the state in which a "color bar screen" or a "monoscope screen" is displayed after the end of the predetermined broadcast. Consequently, in the state in which the predetermined broadcast has ended and the "color bar screen" or the "monoscope screen" is displayed in the image recording apparatus, the image recording apparatus is configured to delete the video data from the recording unit after the recording for a certain fixed time in the recording unit. Consequently, it is possible to configure the image recording apparatus not to record the "color bar screen" and the "monoscope screen", which are unnecessary video after the end of the broadcast, in the recording unit.

Moreover, the state in which the rate of the variation of the sound based on the sound data in the broadcast signal is within the predetermined rate range and the rate of the variation of the image based on the image data in the broadcast signal is within the predetermined rate range indicates the state in which almost no changes of the sound and the image exist, and corresponds, for example, the state in which the image of a scene peripheral to a broadcasting station in the state in which a still sound is output or there are no sounds. Consequently, the image recording apparatus is configured delete the video data from the recording unit after the recording for a certain fixed time in the recording unit in the state in which the predetermined broadcast has ended and the image recording apparatus is in the state of displaying the "image of the scene peripheral to the broadcasting station." Consequently, it is possible not to record the "image of the scene peripheral to the broadcasting station", which is the unnecessary video after the end of the broadcast, in the recording unit in the image recording apparatus.

According to a second aspect of the invention, an image recording apparatus comprises: receiving unit to receive a broadcast signal pertaining to a predetermined broadcast; a recording unit to record video data composed of sound data and image data, both based on a broadcast signal received by the receiving unit; detection unit to detect an end of the predetermined broadcast based on the broadcast signal received by the receiving unit; timer unit to time a detection time for which the detection means continues detecting of the end of the broadcast; judgment unit to judge whether the detection time timed by the timer unit has reached a predetermined elapsed time or not; and record erasing unit to stop recording the video data in the recording unit and to erase the video data having been recorded in the recording unit while the timer means has been timing the predetermined elapsed time, when the judgment means judges that the detection time has reached the predetermined elapsed time.

Thereby, in the image recording apparatus, when the ended state of the predetermined broadcast has been continuously detected for the time equivalent to the predetermined elapsed time from the detection of the end of the predetermined broadcast at the time of recording the video data in the recording unit which data is based on the broadcast signal pertaining to the predetermined broadcast received by the receiving unit, it is possible to stop the recording of the video data in the recording unit, and to erase the unnecessary video data recorded in the recording unit during the predetermined elapsed time from the recording unit.

Consequently, in comparison with the conventional apparatus, which rapidly stops the image recording at the time of detecting the end of a broadcast, the image recording apparatus of the present aspect of the present invention can decrease the generation of the malfunction of the stop of image recording in the case where the detection of the end of the broadcast is a false detection, and can suitably perform the image recording of the video pertaining to the desired broadcast.

Moreover, by erasing the recorded unnecessary video data based on the predetermined elapsed time, the recording of the unnecessary video after the end of the broadcast can be prevented. Consequently, it is possible to perform image recording by recording desired video and the like in the recording unit over a longer period.

Preferably, the image recording apparatus further comprises: sound output unit to output a sound based on the sound data; and an image display unit to display an image based on the image data, wherein the judgment unit judges whether the detection time timed by the timer unit has reached a first elapsed time or not, and judges whether the detection time has reached a second elapsed time or not; and the record erasing unit stops an output of the sound based on the sound data from the sound output unit when the judgment unit judges that the detection time has reached the fist elapsed time, and then stops a display of the image based on the image data on the image display unit and stops recording the video data in the recording unit, and erases the video data having been recorded in the recording unit while the timer unit has been timing the predetermined elapsed time, when the judgment unit subsequently judges that the detection time has reached the second elapsed time.

Thereby, in the image recording apparatus, when the ended state of the predetermined broadcast has been continuously detected for the time equivalent to the first elapsed time from the detection of the end of the predetermined broadcast at the time of recording the video data in the recording unit which data is based on the broadcast signal pertaining to the predetermined broadcast received by the receiving unit, first, it is possible to stop the outputting of the sound based on the sound data from the sound output unit. Then, when the ended state of the broadcast has been continuously detected for the time equivalent to the longer second elapsed time, the display of the image based on the image data on the image display unit is stopped, and the recording of the video data in the recording unit is stopped. Then, the unnecessary video data having been recorded in the recording unit during, for example, the second elapsed time, which is the predetermined elapsed time, can be erased from the recording unit.

Accordingly, by stopping the outputting of the sound from the sound output unit when the image recording apparatus has continuously detected the ended state of the broadcast for the time equivalent to the first elapsed time, the image recording apparatus performs the warning indicating that the image recording apparatus does not receive the broadcast signal of the predetermined broadcast, and it becomes possible to prevent the output of, for example, unpleasant noise sounds in the "sandstorm screen", which is unnecessary video after the end of the broadcast. Then, when the image recording apparatus has been continuously detecting the ended state of the broadcast for the time equivalent to the second elapsed time, it is possible to stop the recording of the video data to the recording unit, and to erase the unnecessary video data from the recording unit which data has been recorded in recording unit during the predetermined elapsed time. Thereby, the image recording of the video pertaining to the desired broadcast can be suitably performed, and it is also becomes possible not to record unnecessary video after the end of the broadcast in the recording unit.

Preferably, the detection unit detects the end of the broadcast based on a fact that no synchronization signals are included in the broadcast signal.

Thereby, the detection means can detect the end of the broadcast based on the fact that no synchronization signals are included in the broadcast signal.

Here, because the state in which no synchronization signals are included in the broadcast signal indicates that the broadcast waves are in the state of being stopped and corresponds to the state in which the predetermined broadcast has ended and the "sandstorm screen" is displayed, the video data of the "sandstorm screen" is deleted after having been recorded for a certain fixed time in the state in which the predetermined broadcast has ended and the "sandstorm screen" is displayed in the image recording apparatus.

Consequently, it is possible not to record the "sandstorm screen", which is unnecessary video after the end of the broadcast, in the recording unit in the image recording apparatus.

Preferably, the detection unit detects the end of the broadcast based on a fact that the sound data is a sound signal having a specific frequency and a fact that the image data is an image signal for displaying a specific image.

Thereby, the detection means can detect the end of the broadcast based on the fact that the sound data is the sound signal having the specific frequency, and the fact that the image data is the image signal displaying the specific image.

Here, the state in which the sound data in the broadcast signal is the sound signal having the specific frequency and the image data in the broadcast signal is the image signal to display the specific image indicates that the broadcast wave is a broadcast wave for an electric wave test, and corresponds to the state in which a "color bar screen" or a "monoscope screen" is displayed after the end of the predetermined broadcast. Consequently, in the state in which the predetermined broadcast has ended and the "color bar screen" or the "monoscope screen" is displayed in the image recording apparatus, the video data of the "color bar screen" and the "monoscope screen" is deleted from the recording unit after having been recorded for a certain fixed time.

Consequently, it is possible to configure the image recording apparatus not to record the "color bar screen" and the "monoscope screen", which are unnecessary video after the end of the broadcast, in the recording unit.

Preferably, the detection unit detects the end of the broadcast based on a fact that a rate of a variation of a sound based on the sound data is within a predetermined range and a fact that a rate of a variation of an image based on the image data is within a predetermined range.

Thereby, the detection means can detects the end of the broadcast based on the fact that the rate of the variation of the sound based on the sound data is within the predetermined rate range, and on the fact that the rate of the variation of the image based on the image data is within the predetermined rate range.

Here, the state in which the rate of the variation of the sound based on the sound data in a broadcast signal is within the predetermined rate range and the rate of the variation of the image based on the image data in the broadcast signal is within a predetermined rate range indicates the state in which almost no changes of the sound and the image exist, and corresponds, for example, the state in which the image of a scene peripheral to a broadcasting station in the state in which a still sound is output or there are no sounds. Consequently, in the state in which the predetermined broadcast has ended and the "image of the scene peripheral to the broadcasting station" is displayed in the recording apparatus, the video data of the "image of the scene peripheral to the broadcasting station" is deleted from the recording unit after the recording for a certain fixed time.

Consequently, it is possible not to record the "image of the scene peripheral to the broadcasting station", which is the unnecessary video after the end of the broadcast, in the recording unit in the image recording apparatus.

Preferably, the receiving unit receives an electric program guide and the detection unit detects the end of the broadcast based on the electric program guide.

Thereby, the detection means can detect a time when all of the programs are not broadcast as the end of the broadcast from the information of the broadcast time of each program listed in an EPG. In the state in which all of the programs are not broadcast in the selected broadcasting station, the video data of the received video is deleted from the recording unit after the recording thereof for the certain fixed time.

Consequently, the recorded data of the unnecessary video after the end of the broadcast can be made not to be recorded in the recording unit.

Preferably, the recording unit includes a first recording medium and a second recording medium; the recording unit records the video data in the first recording medium when the detection unit does not detect the end of the broadcast, and stops recording in the first recording medium to record the video data in the second recording medium when the detection unit detects the end of the broadcast; and the recording unit records the video data recorded in the second recording medium while the timer unit has been timing in the first recording medium when the detection unit judges that the detection time did not reach the predetermined elapsed time.

Thereby, because the recording of the video data in the first recording medium is stopped when the end of the broadcast is detected, no unnecessary video is recorded in the first recording medium. On the other hand, even if the detection of the end of the broadcast is a false detection, because the recorded data recorded on the second recording medium is recorded on the first recorded medium, the video is not broken.

Consequently, it is possible to prevent the first recording medium from being overwritten with video.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

In the following, an embodiment of the image recording apparatus according to the present invention is described in detail by reference to the attached drawings.

Figure 1:
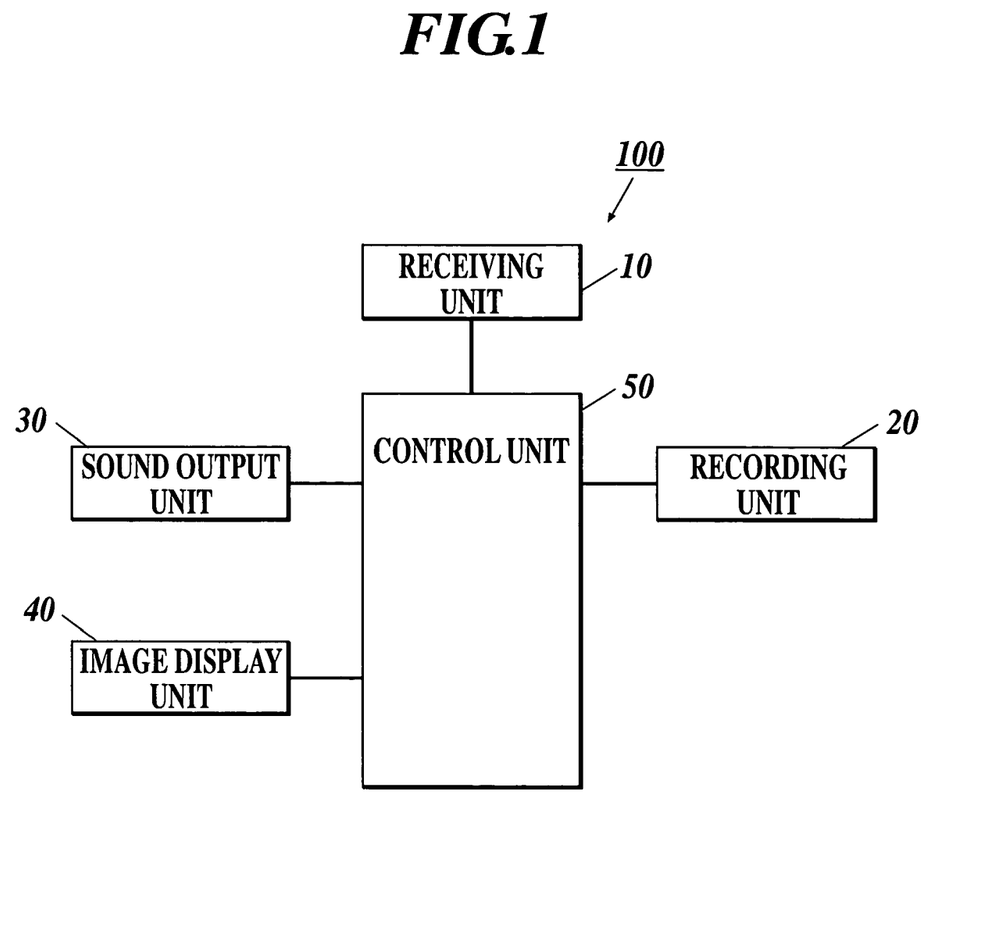
FIG. 1 is a block diagram showing the configuration of the principal part of the image recording apparatus according to the present invention.

FIG. 1 is a block diagram showing the configuration of the principal part of the image recording apparatus according to the present invention.

As shown in FIG. 1, the image recording apparatus 100 is provided with a receiving unit 10 receiving a broadcast signal, a recording unit 20 recording video data based on a broadcast signal received by the receiving unit 10, a sound output unit 30 outputting a sound based on sound data in video data, an image display unit 40 displaying an image based on image data in the video data, a control unit 50 controlling the operation of each unit mentioned above, and the like.

The receiving unit 10 is, for example, antenna equipment. The receiving unit 10 receives a broadcast signal, and sends out the received broadcast signal to the control unit 50.

The recording unit 20 is composed of, for example, a digital versatile disk (DVD) recorder or a hard disk drive (HDD) recorder, and records video data composed of sound data and image data, both based on the broadcast signal received by the receiving unit 10.

The sound output unit 30 is, for example, speaker equipment, and outputs a sound based on the sound data based on the broadcast signal received by the receiving unit 10 or the sound data of the video data recorded in the recording unit 20.

The image display unit 40 is, for example, liquid crystal display equipment, and displays an image or video which is based on the image data based on a broadcast signal received by the receiving unit 10 or the image data of the video data recorded in the recording unit 20.

The control unit 50 is provided with, for example, a CPU. The control unit 50 performs the integrated control of the operation of each unit pursuant to various control programs for the image recording apparatus stored in a not shown ROM or the like in obedience to an operation input signal input from a not shown input unit, or in obedience to set data or the like set beforehand, and stores a processing result of the integrated control into a work area in a not shown RAM.

Then, the control unit 50 controls the operation of each unit constituting the image recording apparatus 100.

Furthermore, the control unit 50 converts a broadcast signal received by the receiving unit 10 into sound data and image data, both are digital data, and functions as image recording control means for performing recording in the recording unit 20.

Moreover, the control unit 50 functions as detection means for detecting an end of a predetermined broadcast based on a broadcast signal received by the receiving unit 10.

In particular, the control unit 50 as the detection means detects the end of a broadcast based on the fact that no synchronization signals are included in the broadcast signal of the broadcast.

Here, the state in which no synchronization signals are included in a broadcast signal indicates a stopped wave state of any broadcast waves, and corresponds to the state in which a predetermined broadcast has ended and a "sandstorm screen" is displayed.

Moreover, the control unit 50 as the detection means detects the end of a broadcast based on the fact that sound data is a sound signal having a specific frequency, and the fact that image data is an image signal displaying a specific image.

Here, the state in which the sound data in a broadcast signal is the sound signal having the specific frequency and the image data in the broadcast signal is the image signal displaying the specific image indicates that the broadcast wave is a broadcast wave for an electric wave test, and corresponds to the state in which a "color bar screen" or a "monoscope screen" is displayed after the end of a predetermined broadcast.

Moreover, the control unit 50 as the detection means detects the end of a broadcast based on the fact that the rate of a variation of the sound based on sound data is within a predetermined rate range and the fact that the rate of a variation of the image based on image data is within a predetermined rate range.

Here, the state in which the rate of a variation of the sound based on sound data in a broadcast signal is within a predetermined rate range and the rate of a variation of the image based on image data in the broadcast signal is within a predetermined rate range corresponds to a state in which the image of a scene peripheral to a broadcasting station is displayed with a background music (BGM) flowing still or without any sounds in a state in which almost no changes of the sound and the image occur although any broadcast waves are not in the stopped wave state or the broadcast wave is not the one for the electric wave test. Then, if a vehicle or a person passes around a broadcasting station, then the movement thereof becomes a variation of the image.

That is, because the rate of the variation of a sound of a BGM is smaller than that of a sound at the time of an ordinary broadcast, and because the rate of the variation of the image of a scene peripheral to a broadcasting station is smaller than that of the image at the time of an ordinary broadcast, the end of a broadcast is set to be detected when the rate of the variation of a sound based on the broadcast signal to a reference value of the variation of a sound which has been set beforehand is 10% or less and the rate of the variation of the image based on the broadcast signal is 10% or less. Incidentally, the value of the 100% of a variation, which is set as the reference value, is set by performing the previous measurement and the previous detection of variations of sounds and images at the time of ordinary broadcasts.

Incidentally, the methods by which the control unit 50 as the detection means detects the stopped wave state of broadcast waves, the broadcast wave which is the broadcast wave for an electric wave test, and the sound based on a broadcast wave which is an BGM and an image based on the broadcast wave which is the image of a scene peripheral to a broadcasting station are known techniques, and accordingly the methods are not described in detail here.

Moreover, the control unit 50 as the detection means detects the end of a broadcast based on the information on an electric program guide (EPG).

Here, the EPG means a program table of ground wave television broadcasting, satellite broadcasting and the like, which are delivered by an electric wave, the Internet and the like. The control unit 50 detects a time when all of the programs are not broadcast as an end of the broadcasts based on the information of the broadcast time of each program listed in the EPG received by the receiving unit 10.

Moreover, the control unit 50 functions as timer means for timing a detection time for which the control unit 50 as the detection means continues detecting the end of the broadcasts.

Moreover, the control unit 50 functions as judgment means for judging whether the detection time timed by the control unit 50 as the timer means has reached a predetermined elapsed time or not.

In particular, the control unit 50 as the judgment means judges whether the detection time has reached a first elapsed time (for example, five minutes), which is a relatively short time, or not, and whether the detection time has reached a second elapsed time (for example, ten minutes), which is relatively long time, or not. Incidentally, the settings pertaining to the predetermined elapsed time, the first elapsed time and the second elapsed time are made to be able to be set at arbitrary times, and the setting times are made to be set by being stored in not shown storage means such as an EEPROM.

Moreover, the control unit 50 functions as record erasing means for stopping the recording of video data in the recording unit 20 and for erasing the video data recorded in the recording unit 20 while the control unit 50 as the timing means has been timing the predetermined elapsed time when the control unit 50 as the judgment means judges that the detection time has reached the predetermined elapsed time.

In particular, the control unit 50 as the record erasing means stops the output of the sound based on the sound data from the sound output unit 30 when the control unit 50 as the judgment means judges that the detection time has reached the first elapsed time. Then, the control unit 50 as the record erasing means stops the display of the image based on the image data on the image display unit 40 and stops the recording of the video data in the recording unit 20 when the control unit 50 as the judgment means judges that the detection time has reached the second elapsed time. Furthermore, the control means 50 as the record erasing means erases the video data recorded in the recording unit 20 while the control unit 50 as the timer means has been timing the predetermined elapsed time (the second elapsed time).

Figure 2:
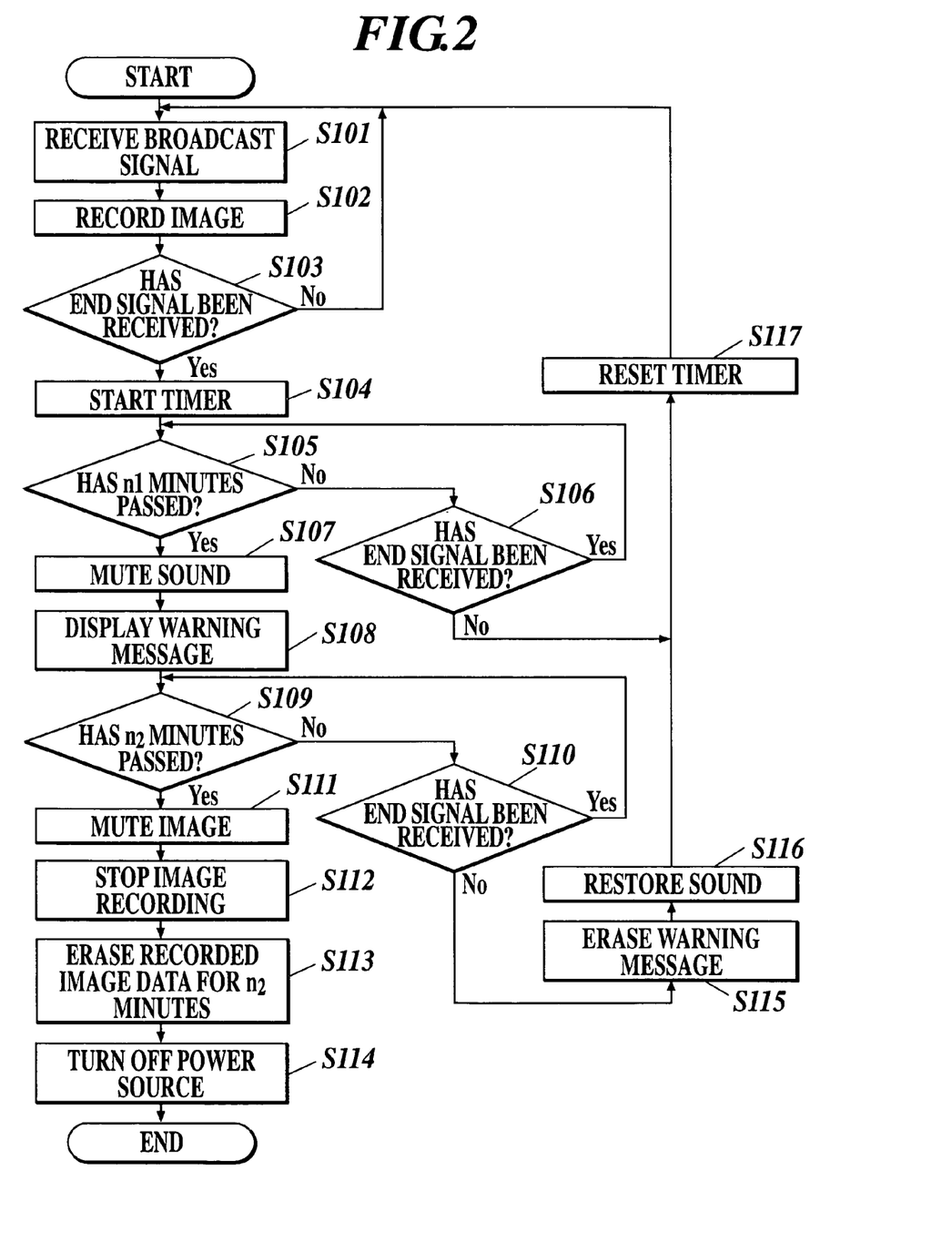
FIG. 2 is a flowchart showing an example of the image recording processing of an image recording apparatus according to the present invention.

Next, an example of the recording processing of video data based on a broadcast signal in the image recording apparatus 100 is described based on the flowchart shown in FIG. 2.

First, by the depression of a not shown main switch in the image recording apparatus 100, the image recording apparatus 100 receives a broadcast signal pertaining to the predetermined broadcast according to a selected channel or the like through the receiving unit 10 (Step S101).

Then, the control unit 50 converts the received broadcast signal into sound data and image data, both being digital data, and records the video data composed of the sound data and the image data in the recording unit 20 to perform the image recording of video (Step S102). Incidentally, the sound based on the sound data is output from the sound output unit 30, and the image or the video based on image data is displayed on the image display unit 40 at the time of the image recording processing.

After that, the control unit 50 monitors the end of a predetermined broadcast, and judges whether the end of the broadcast has been detected or not (Step S103).

Then, when the control unit 50 judges that the end of the broadcast has not been detected (Step S103; No), the control unit 50 returns its processing to Step S101.

On the other hand, when the control unit 50 judges that the end of the broadcast has been detected (Step S103; Yes), the control unit 50 starts a timer, and times the detection time during which the control unit 50 continues the detection of the end of the broadcast (Step S104).

After that, the control unit 50 judges whether the detection time has reached a time point when five minutes have elapsed, which is a first elapsed time (n1), or not (Step S105).

Then, when the control unit 50 judges that the detection time has not reached the time point when five minutes have elapsed, which is the first elapsed time, (Step S105; No), the control unit 50 judges whether the control unit 50 continues the detection of the end of the broadcast or not (Step S106).

When the control unit 50 judges that the control unit 50 continues detecting the end of the broadcast (Step S106; Yes), the control unit 50 returns its processing to Step S105.

On the other hand, when the control unit 50 judges that the control unit 50 does not continue detecting the end of the broadcast (Step S106; No), the control unit 50 advances its processing to Step S117.

On the other hand, when the control unit 50 judges that the detection time has reached at the time point when five minutes have passed, which is the first elapsed time, (Step S105; Yes), the control unit 50 stops the output of the sound from the sound output unit 30 (sound muting) (Step S107), and displays a warning message indicating the fact that the reception of the broadcast signal pertaining to the predetermined broadcast has not been performed on the image display unit 40 (Step S108).

After that, the control unit 50 judges whether the control unit 50 has reached at a time point when ten minutes have elapsed, which is the second elapsed time (n2), (has reached at a time point when further five minutes have elapsed from the first elapsed time) or not (Step S109).

Then, when the control unit 50 judges that the detection time has not reached the time point when ten minutes have elapsed, which is the second elapsed time, yet (Step S109; No), the control unit 50 further judges whether the control unit 50 continues detecting the end of the broadcast or not (Step S110).

When the control unit 50 judges that the control unit 50 continues detecting the end of the broadcast (Step S110; Yes), the control unit 50 returns its processing to Step S109.

On the other hand, when the control unit 50 judges that the control unit 50 does not continue detecting the end of the broadcast (Step S110; No), the control unit 50 advances its processing to Step S115.

On the other hand, when the control unit 50 judges that the detection time has reached the time point when ten minutes have elapsed, which is the second elapsed time, (Step S109; Yes), the control unit 50 stops the display of the image on the image display unit 40 (image muting) (Step S111), and stops the performing of the image recording of recording the video data in the recording unit 20 (Step S112). Incidentally, at Step S111, the control unit 50 may display a black background or a blue background on the image display unit 40 in place of the image muting.

After that, the control unit 50 goes back to the time point before ten minutes, which is the time point when the control unit 50 has begun detecting the end of the broadcast and is the second elapsed time, and the control unit 50 erases the video data for the ten minutes from the recording unit 20 (Step S113).

Then, the control unit 50 turns off the power supply of the image recording apparatus 100 (Step S114), and ends the image recording processing.

At Step S115, the control unit 50 erases the display of the warning message on the image display unit 40 (Step S115), and after that, returns the image recording apparatus 100 so as to output a sound from the sound output unit 30 (Step S116). Then, the control unit 50 advances its processing to Step S117.

At Step S117, the control unit 50 resets the timer (detection time=0 minute), and returns its processing to Step S101.

In such a way, the image recording apparatus 100 according to the present invention is configured to stop image recording when the recording apparatus 100 has detected the end of the predetermined broadcast and has continued detecting the end of the broadcast for the time equivalent to the predetermined elapse time (the detection time) at the time of performing the image recording of the video pertaining to the desired broadcast and the like. Consequently, in comparison with the prior art, by which the image recording is rapidly stopped when the end of a broadcast is detected, the times of the malfunction of the stop of image recording in the case when the end of the broadcast is caused by a false detection can be decreased, and the image recording of the video pertaining to the desired broadcast can be suitably performed.

Then, the unnecessary video data (such as the "sandstorm screen", the "color bar screen", the "monoscope screen", the "image of the scene peripheral to the broadcasting station", and the like) recorded in the recording unit 20 as the image recording during the predetermined elapsed time set as an interval for judging whether the end of the broadcast has been caused by the false detection or not can be erased from the recording unit 20 based on the predetermined elapsed time. Consequently, no recording of unnecessary video after the end of the broadcast is performed.

Thereby, desired video and the like can be recorded in the recording unit 20 for a longer period by performing the image recording thereof.

In particular, when the recording unit 20 is the one of the type in which the DVD and the HDD are used together, the recording and the image recording of the video and the like in the recording unit 20 can be performed by changing them to each of the DVD and the HDD.

For example, first, the image recording of video (video data) is made to be performed to the DVD, and when the end of a broadcast is detected, the recording unit 20 is switched to the HDD, which is a buffer, to perform the image recording of the video (video data).

Then, when the end of a broadcast is detected by a false detection, the video (video data) is moved from the HDD to the DVD, and then the image recording to the DVD is resumed.

On the other hand, when the end of the broadcast has continued being detected for the predetermined time, unnecessary video (video data) recorded on the HDD is erased.

Because no unnecessary video is recorded on the DVD in such a recording system, no desired video is recorded by overwriting unnecessary video on the DVD.

Consequently, because video and the like can be recorded in the state with few noises on the DVD, and because the DVD is not used for the image recording of unnecessary video, the prolongation of lives of media such as the DVD can be achieved.

Incidentally, although the example of the DVD and the HDD as the recording unit 20 has been described in the embodiment described above, the present invention is not limited to such a recording unit, and a video cassette recorder (VCR) may be used as the recording unit.

In case of using the VCR as the recording unit, in order to erase the unnecessary video data recorded in the recording unit 20 as image recording during the predetermined elapsed time, the video cassette is rewound for the predetermined elapsed time, and the video of the unnecessary video data is erased.

Moreover, although the output of a sound from the sound output unit 30 is first stopped at the time when the first elapsed time (n1=five minutes) has come and the image display on the image display unit 40 is secondly stopped to stop the image recording at the time when the second elapsed time (n2=ten minutes) has come in the embodiment described above, the present invention is not limited to such a way. Both of the outputs of the sound and the image may be simultaneously stopped to stop the image recording at the time when the predetermined elapsed time has come.

Moreover, although the embodiment described above is configured to erase the video data in order to erase unnecessary video having been recorded without any intention of recording for making the part be in the unrecorded state, the present invention is not limited to such a configuration. The unnecessary video data may be erased by overwriting the unnecessary video data with desired video.

Moreover, it is needless to say that concrete constructional details and the like can be suitably modified in addition.

The entire disclosure of Japanese Patent Application No. 2005-025954 filed on Feb. 2, 2005, including description, claims, drawings and summary are incorporated herein by reference.

What is claimed is:

1. An image recording apparatus, comprising:
    a receiving unit to receive a broadcast signal pertaining to a predetermined broadcast;
    a recording unit to record video data composed of sound data and image data, both based on the broadcast signal received by the receiving unit;
    a sound output unit to output a sound based on the sound data;
    an image display unit to display an image based on the image data;
    detection unit to detect an end of a predetermined broadcast according to the broadcast signal received by the receiving unit based on a fact that no synchronization signals are included in the broadcast signal, or a fact that the sound data in the broadcast signal is a sound signal having a specific frequency and the image data in the broadcast signal is an image signal for displaying a specific image, or a fact that a rate of a variation of the sound based on the sound data in the broadcast signal is within a predetermined range and a rate of a variation of the image based on the image data in the broadcast signal is within a predetermined range;
    timer unit to time a detection time for which the detection unit continues to detect the end of the broadcast;
    judgment unit to judge whether the detection time timed by the timer unit has reached a first elapsed time or not, and to judge whether the detection time has reached a second elapsed time or not; and
    record erasing unit to stop an output of the sound based on the sound data from the sound output unit when the judgment unit judges that the detection time has reached the first elapsed time, and then to stop a display of the image based on the image data on the image display unit, to stop recording the video data in the recording unit and to erase the video data having been recorded in the recording unit while the timer unit has been timing a predetermined elapsed time when the judgment unit subsequently judges that the detection time has reached the second elapsed time.

2. An image recording apparatus comprising:
a receiving unit to receive a broadcast signal pertaining to a predetermined broadcast;
a recording unit to record video data composed of sound data and image data, both based on a broadcast signal received by the receiving unit;
detection unit to detect an end of the predetermined broadcast based on the broadcast signal received by the receiving unit;
timer unit to time a detection time for which the detection unit continues detecting of the end of the broadcast;
judgment unit to judge whether the detection time timed by the timer unit has reached a predetermined elapsed time or not; and
record erasing unit to stop recording the video data in the recording unit and to erase the video data having been recorded in the recording unit while the timer unit has been timing the predetermined elapsed time, when the judgment unit judges that the detection time has reached the predetermined elapsed time.

3. The image recording apparatus as claimed in claim 2, further comprising:
a sound output unit to output a sound based on the sound data; and
an image display unit to display an image based on the image data,
wherein the judgment unit judges whether the detection time timed by the timer unit has reached a first elapsed time or not, and judges whether the detection time has reached a second elapsed time or not; and
the record erasing unit stops an output of the sound based on the sound data from the sound output unit when the judgment unit judges that the detection time has reached the fist elapsed time, and then stops a display of the image based on the image data on the image display unit and stops recording the video data in the recording unit, and erases the video data having been recorded in the recording unit while the timer unit has been timing the predetermined elapsed time, when the judgment unit subsequently judges that the detection time has reached the second elapsed time.

4. The image recording apparatus as claimed in claim 2, wherein the detection unit detects the end of the broadcast based on a fact that no synchronization signals are included in the broadcast signal.

5. The image recording apparatus as claimed in claim 2, wherein the detection unit detects the end of the broadcast based on a fact that the sound data is a sound signal having a specific frequency and a fact that the image data is an image signal for displaying a specific image.

6. The image recording apparatus as claimed in claim 2, wherein the detection unit detects the end of the broadcast based on a fact that a rate of a variation of a sound based on the sound data is within a predetermined range and a fact that a rate of a variation of an image based on the image data is within a predetermined range.

7. The image recording apparatus as claimed in claim 2, wherein the receiving unit receives an electric program guide and the detection unit detects the end of the broadcast based on the electric program guide.

8. The image recording apparatus as claimed in claim 2,
wherein the recording unit includes a first recording medium and a second recording medium;
the recording unit records the video data in the first recording medium when the detection unit does not detect the end of the broadcast, and stops recording in the first recording medium to record the video data in the second recording medium when the detection unit detects the end of the broadcast; and
the recording unit records the video data recorded in the second recording medium while the timer unit has been timing in the first recording medium when the detection unit judges that the detection time did not reach the predetermined elapsed time.

9. The image recording apparatus as claimed in claim 3, wherein the detection unit detects the end of the broadcast based on a fact that no synchronization signals are included in the broadcast signal.

10. The image recording apparatus as claimed in claim 3, wherein the detection unit detects the end of the broadcast based on a fact that the sound data is a sound signal having a specific frequency and a fact that the image data is an image signal for displaying a specific image.

11. The image recording apparatus as claimed in claim 3, wherein the detection unit detects the end of the broadcast based on a fact that a rate of a variation of the sound based on the sound data is within a predetermined range and a fact that a rate of a variation of the image based on the image data is within a predetermined range.

12. An image recording apparatus as claimed in claim 3, wherein the receiving unit receives an electric program guide and the detection unit detects the end of the broadcast based on the electric program guide.

13. The image recording apparatus as claimed in claim 3,
wherein the recording unit includes a first recording medium and a second recording medium;
the recording unit records the video data in the first recording medium when the detection unit does not detect the end of the broadcast, and stops recording in the first recording medium to record the video data in the second recording medium when the detection unit detects the end of the broadcast; and
the recording unit records the video data recorded in the second recording medium while the timer unit has been timing in the first recording medium when the detection unit judges that the detection time did not reach the predetermined elapsed time.

* * * * *

UNITED STATES PATENT AND TRADEMARK OFFICE
CERTIFICATE OF CORRECTION

PATENT NO. : 7,606,461 B2  Page 1 of 1
APPLICATION NO. : 11/344150
DATED : October 20, 2009
INVENTOR(S) : Yoshiyuki Kunita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this

Twelfth Day of October, 2010

David J. Kappos
*Director of the United States Patent and Trademark Office*